United States Patent
Jorasch et al.

(10) Patent No.: US 8,204,199 B2
(45) Date of Patent: *Jun. 19, 2012

(54) METHOD AND APPARATUS FOR MONITORING DEVICE STATUS

(75) Inventors: James A. Jorasch, Stamford, CT (US); Jay S. Walker, Ridgefield, CT (US); Magdalena M. Fincham, Norwalk, CT (US); John B. Dickerson, Syracuse, NY (US); Marc D. Kessman, Pound Ridge, NY (US); Geoffrey M. Gelman, Stamford, CT (US); Stephen C. Tulley, Fairfield, CT (US); Dean P. Alderucci, Stamford, CT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1141 days.

This patent is subject to a terminal disclaimer.

(21) Appl. No.: 11/421,524

(22) Filed: Jun. 1, 2006

(65) Prior Publication Data

US 2006/0203969 A1  Sep. 14, 2006

Related U.S. Application Data

(63) Continuation of application No. 11/338,151, filed on Jan. 24, 2006, now Pat. No. 7,260,201, which is a continuation of application No. 10/090,795, filed on Mar. 5, 2002, now Pat. No. 7,010,110, which is a continuation-in-part of application No. 09/282,360, filed on Mar. 31, 1999, now abandoned.

(51) Int. Cl.
*H04M 3/42* (2006.01)

(52) U.S. Cl. ............ 379/207.04; 379/201.01; 379/32.01

(58) Field of Classification Search ............... 379/32.01, 379/188, 266.01, 27.01, 32.04, 133, 201.01, 379/207.02, 207.03, 207.04, 207.05, 207.06, 379/207.07

See application file for complete search history.

(56) References Cited

U.S. PATENT DOCUMENTS

| | | | |
|---|---|---|---|
| 3,836,725 A | 9/1974 | Celestini | 179/18 FG |
| 4,216,355 A | 8/1980 | Gerber | 179/18 AB |
| 4,250,352 A | 2/1981 | Workman, Sr. | 179/2 A |
| 4,286,117 A | 8/1981 | Schreyer et al. | 179/5 R |
| 4,291,199 A | 9/1981 | Densmore et al. | 179/18 AB |
| 4,747,120 A | 5/1988 | Foley | 379/38 |
| 4,847,893 A | 7/1989 | Dang et al. | 379/95 |

(Continued)

FOREIGN PATENT DOCUMENTS

EP  1161067 A2  12/2001

(Continued)

OTHER PUBLICATIONS

Michalski, Jerry, "Buddy Lists", Release 1.0, Esther Dyson's Monthly Report, Jun. 20, 1997, 5 pp.

(Continued)

*Primary Examiner* — Ahmad Matar
*Assistant Examiner* — Oleg Asanbayev

(57) ABSTRACT

The monitor is for monitoring the status of a first client telephone, and for sending this status information via a central server to an authorized second client telephone. The central server stores a database of registered client telephones and corresponding client telephones that the client may monitor. A user of a registered client telephone monitors in real time the telephone status of registered friends, family, or co-workers that have agreed to be monitored by the user.

18 Claims, 15 Drawing Sheets

U.S. PATENT DOCUMENTS

| | | | | |
|---|---|---|---|---|
| 5,109,486 | A | 4/1992 | Seymour | 395/200 |
| 5,465,286 | A | 11/1995 | Clare et al. | 379/34 |
| 5,467,386 | A | 11/1995 | Trell | 379/103 |
| 5,535,267 | A | 7/1996 | Schull | 379/106 |
| 5,557,659 | A | 9/1996 | Hyde-Thomson | 379/88 |
| 5,636,267 | A | 6/1997 | Utsumi et al. | 379/67 |
| 5,644,624 | A | 7/1997 | Caldwell | 379/69 |
| 5,682,422 | A | 10/1997 | Oliver | 379/107 |
| 5,696,811 | A | 12/1997 | Maloney et al. | 379/34 |
| 5,701,295 | A | 12/1997 | Bales et al. | 370/271 |
| 5,706,330 | A | 1/1998 | Bufferd et al. | |
| 5,790,803 | A | 8/1998 | Kinoshita et al. | |
| 5,812,668 | A | 9/1998 | Weber | 380/24 |
| 5,889,474 | A | 3/1999 | LaDue | |
| 5,892,764 | A | 4/1999 | Riemann et al. | 370/401 |
| 5,937,035 | A | 8/1999 | Andruska et al. | 379/34 |
| 5,946,317 | A | 8/1999 | Parkhideh | 370/410 |
| 5,960,442 | A | 9/1999 | Pickering | 707/104 |
| 6,347,134 | B1* | 2/2002 | Sherwood et al. | 379/88.08 |
| 6,366,663 | B1* | 4/2002 | Bauer et al. | 379/221.13 |
| 6,430,278 | B1 | 8/2002 | Suzuki | |
| 6,502,022 | B1 | 12/2002 | Chastain et al. | |
| 6,542,075 | B2* | 4/2003 | Barker et al. | 340/506 |
| 6,587,450 | B1* | 7/2003 | Pasanen | 370/338 |
| 6,600,817 | B1 | 7/2003 | Shaffer et al. | |
| 6,654,459 | B1 | 11/2003 | Bala et al. | |
| 6,665,376 | B1* | 12/2003 | Brown | 379/85 |
| 6,700,971 | B1 | 3/2004 | Cohen et al. | |
| 6,839,320 | B2* | 1/2005 | Paridaens et al. | 370/230 |
| 7,246,371 | B2 | 7/2007 | Diacakis et al. | |
| 7,260,201 | B2 | 8/2007 | Jorasch et al. | |
| 7,542,569 | B1* | 6/2009 | Leiwo | 380/247 |
| 7,543,146 | B1* | 6/2009 | Karandikar et al. | 713/175 |
| 2001/0005670 | A1* | 6/2001 | Lahtinen | 455/2.01 |
| 2002/0112048 | A1* | 8/2002 | Gruyer et al. | 709/224 |
| 2002/0128004 | A1 | 9/2002 | Kanerva | |
| 2003/0008644 | A1 | 1/2003 | Akhterzzaman et al. | |
| 2006/0126817 | A1 | 6/2006 | Beckett et al. | |
| 2006/0252431 | A1 | 11/2006 | Mullen | |
| 2007/0049290 | A1 | 3/2007 | Mullen | |
| 2007/0281671 | A1 | 12/2007 | Mullen | |
| 2007/0281765 | A1 | 12/2007 | Mullen | |

FOREIGN PATENT DOCUMENTS

| | | |
|---|---|---|
| WO | WO 99/04545 | 1/1999 |
| WO | WO 00/59191 | 10/2000 |

OTHER PUBLICATIONS

"Monitor tracks telephone line tie-ups in departments; telephone traffic monitor", Jan. 16, 1983, vol. 57, p. 106, 2pp.

Shapiro, Eben, "Business Technology; Phones Getting Smarter With Built-In Computer", The New York Times, Apr. 17, 1991, Section D, p. 1, col. 4, Financial Desk, 3pp.

"NYNEX field tests new protocol for screen-based phones", Business Wire, Mar. 29, 1993, 2pp.

Boom, W. et al., "New Group Feature Collection for SOPHO-S ISPBXs", Philips Telecommunication Review, Dec. 1993, vol. 51, No. 3, 8pp.

"Innovative Strategies for Busting Fraud", Financial Services Report, Phillips Business Information, Jan. 3, 1996, vol. 13, Issue 1, 3pp.

Rowland, Elaine, "Good things come in small packages; key systems; includes related articles on specific systems; Buyers Guide", Teleconnect, Feb. 1997, Section: No. 2, vol. 15, p. 70, ISSN: 0740-9354, 7pp.

"ISS Teams Up with Singlepoint Systems to Provide Industry's First, 'Security Hotline' for Anytime, Anywhere Responses to Break-ins", Business Editors & Technology Writers, Sep. 9, 1998, 3pp.

PCT International Search Report for Application No. PCT/US 99/27892, dated Nov. 4, 2000, 2pp.

Guernsey, Lisa, "You Can Surf, But You Can't Hide", The New York Times, Feb. 7, 2002, Section: Technology, (http://www.nytimes.com/2002/02/07/technology/circuits/07HERE.html), 3pp.

Esther Dyson's Monthly Report, Release 1.0, Jun. 20, 1997, 28 pp.

Guernsey, Lisa, "You Can Surf But You Can't Hide" The New York Times, Feb. 7, 2002, 7 pp.

United States Office Action, U.S. Appl. No. 11/421,517, Sep. 28, 2009, 12 pages.

United States Office Action, U.S. Appl. No. 11/421,517, May 14, 2010, 13 pages.

United States Office Action, U.S. Appl. No. 11/421,535, Jul. 9, 2010, 10 pages.

United States Office Action, U.S. Appl. No. 11/421,535, Oct. 1, 2009, 6 pages.

United States Office Action, U.S. Appl. No. 11/316,758, Sep. 17, 2010, 10 pages.

United States Office Action, U.S. Appl. No. 11/316,758, Dec. 29, 2009, 8 pages.

International Search Report, International Application No. PCT/US03/07105, May 13, 2003, 5 pages.

International Written Opinion, International Application No. PCT/US03/07105, Oct. 2, 2003, 3 pages.

United States Office Action, U.S. Appl. No. 11/421,517, Nov. 4, 2010, 14 pages.

* cited by examiner

← 416

| MONITORED CLIENT SPID 602 | MONITORED CLIENT NAME 604 | STATUS 606 |
|---|---|---|
| 1-203-555-0000-1212 | JANE | BUSY |
| 1-203-555-9999-3434 | BOB | LINE FREE |
| 1-914-666-7777-5656 | KELLY | HOME |
| 1-212-444-3333-7878 | MARK | WORKING |
| 1-201-555-4449-8989 | JOE | HOME / BUSY |

| MONITORED CLIENT SPID 702 | MONITORING CLIENT SPID 704 | MONITORED STATUS 706 | CURRENT STATUS 708 |
|---|---|---|---|
| 1-203-555-0000-1212 | 1-212-999-5555-8989 | BUSY / LINE FREE | BUSY |
| 1-203-555-9999-3434 | 1-914-666-8888-4545 | WORKING / NOT WORKING | NOT WORKING |
| 1-914-666-7777-5656 | 1-410-111-9999-1010 | BUSY / LINE FREE | LINE FREE |
| 1-212-444-3333-7878 | 1-810-666-6565 | HOME / NOT HOME | HOME |
| 1-201-555-4449-8989 | 1-212-999-5555-8989 | HOME / NOT HOME BUSY / LINE FREE | HOME / BUSY |

| DTMF CODE 712 | STATUS 714 |
|---|---|
| *666 | WORKING |
| *667 | NOT WORKING |
| *668 | HOME |
| *669 | NOT HOME |

FIG. 7B

| SPID ADDRESS 802 | TCP / IP ADDRESS 804 |
|---|---|
| 1-212-999-5555-8989 | 208.219.50.200 |
| 1-914-666-8888-4545 | 212.312.90.300 |
| 1-410-111-9999-1010 | 316.445.70.100 |
| 1-810-666-6565 | 309.415.10.400 |

FIG. 8

METHOD AND APPARATUS FOR MONITORING DEVICE STATUS

The present application is a continuation of U.S. patent application Ser. No. 11/338,151, entitled "METHOD AND APPARATUS FOR MONITORING TELEPHONE STATUS", filed Jan. 24, 2006 and issued as U.S. Pat. No. 7,260,201 on Aug. 21, 2007;

which is a continuation of U.S. patent application Ser. No. 10/090,795, filed Mar. 5, 2002 and issued as U.S. Pat. No. 7,010,110 on Mar. 7, 2006;

which is a continuation-in-part of U.S. patent application Ser. No. 09/282,360, filed Mar. 31, 1999, now abandoned.

This application is also related to U.S. patent application Ser. No. 11/421,517 filed Jun. 10, 2006 and U.S. patent application Ser. No. 11/421,535 filed Jun. 10, 2006.

BACKGROUND OF THE INVENTION

Conventional telephone systems can provide a caller's status information, but do so in a costly manner that requires significant user time. For example, the office based PBX telephone system provides a caller with status information.

Determining whether the party's line is busy or available requires a caller's telephone to poll a central station and wait for a call back to receive status information.

At present, the telephone industry is in the process of switching to digital technology (i.e., Integrated Services Digital Network (ISDN), and Asymmetric Digital Loop (ASDL)). ISDN is an international communications standard for sending voice and data over telephone lines. ISDN technology transmits data at a rate far faster than prior telephone connection technologies. ISDN lines generally include three channels, two bearer (B) channels and one data (D) channel. Each B channel carries voice and data at a bandwidth of 64 kbps (thousands of bits per second), and the D channel handles signal control information. ISDN's two B channels enable the caller to simultaneously receive and send information. Currently, digitally enabled telephones are being produced.

BRIEF DESCRIPTION OF THE DRAWINGS

FIG. 6 shows an exemplary table of a monitored party database stored on a client telephone.

FIG. 7A shows an exemplary table of a client database stored on a central server.

FIG. 7B shows an exemplary DTMF code database stored on a central server.

FIG. 8 shows an exemplary TCP/IP information database stored on a central server.

DETAILED DESCRIPTION OF A PREFERRED EMBODIMENT

The telephone disclosed in various embodiments of the present invention may be configured in accordance with a "plug-and-play" protocol. The user of the telephone simply plugs the telephone into a telephone jack. The telephone automatically connects to the central server, receives TCP/IP information from the server for future communications and registers the client. The client then selects the parties that the client wishes to monitor.

The client may select parties to monitor by programming the parties' telephone numbers into the client's local telephone or by a directory lookup by name. The client's telephone communicates these telephone numbers to the central server and the central server verifies that the parties agree to be monitored. Once the parties agree, the parties register with the system. The client may also select parties to monitor by contacting the service associated with the central server off-line and submitting a request to monitor the specified parties. The central service may verify the agreement of the parties to be monitored by contacting them off-line (e.g., via telephone call, postal mail, e-mail).

Alternatively, the process to select parties to monitor may be initiated by the monitored party. The party to be monitored submits a request to the central server. In return, the central server remotely programs the monitoring party's telephone with the monitored party's status and identification information. It will be appreciated that the monitoring party may locally program its telephone. If the monitored party requests a monitoring party that is currently not a client to the status monitoring service, the service contacts the monitoring party off-line to determine if this party wishes to become a client to the service to receive status updates from the monitored party.

Figure 1:
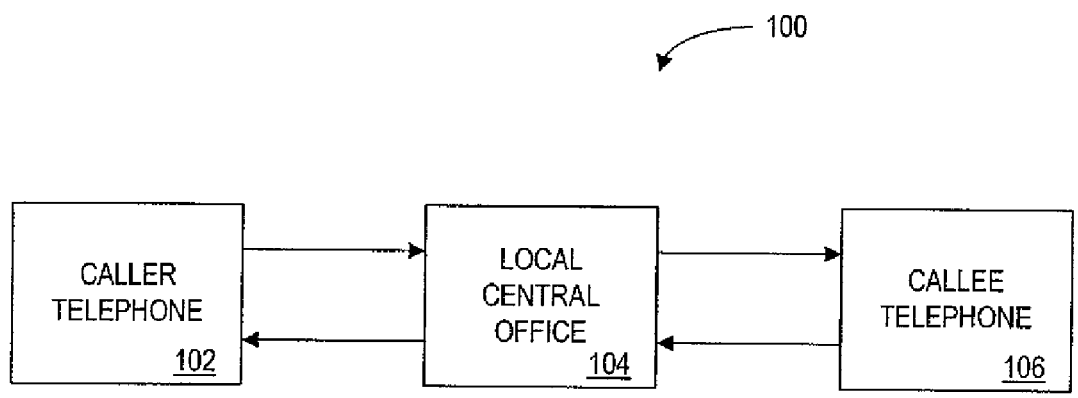
FIG. 1 shows a schematic diagram of a conventional telephone system.
Figure 2:
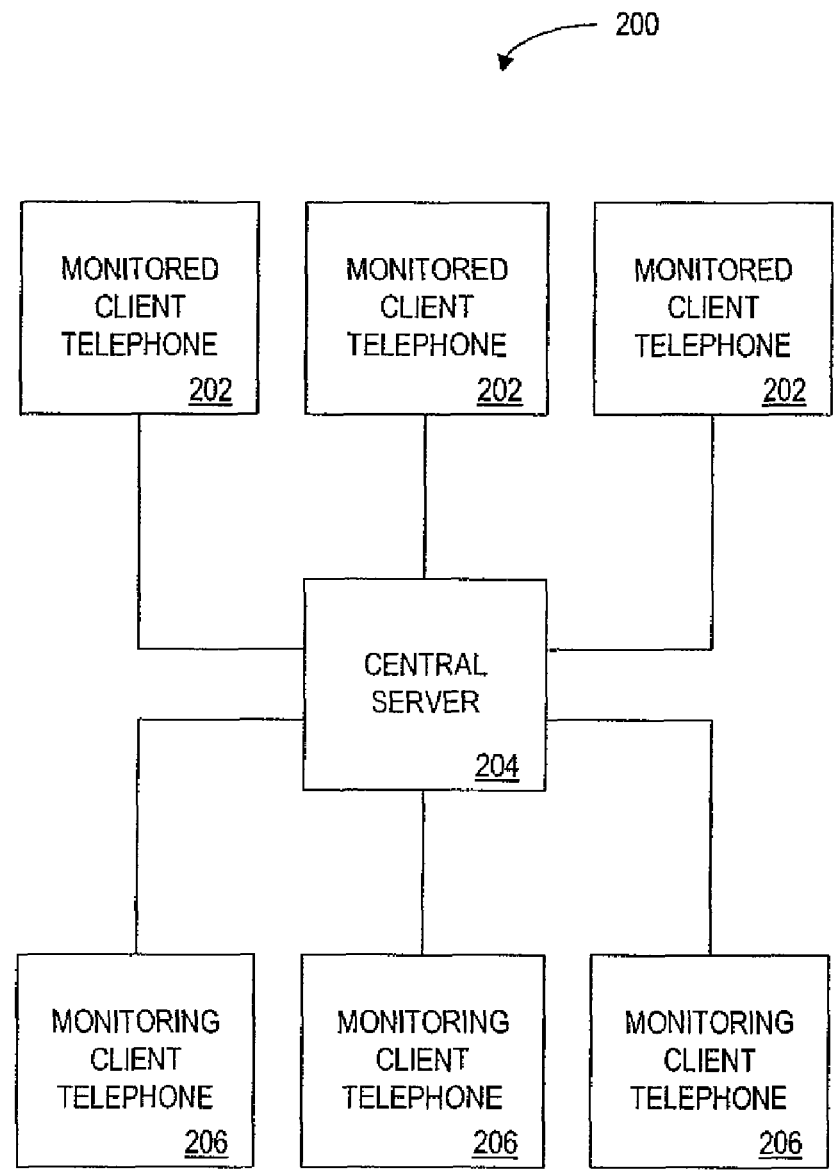
FIG. 2 shows a schematic diagram of the digital phone monitoring system of an embodiment of the present invention.

Referring first to FIG. 2, a schematic diagram of the digital phone monitoring system of an embodiment of the present invention may be generally appreciated. It will be appreciated that an embodiment of the present invention defines a first telephone as a monitored client telephone 202, and defines a second telephone as a monitoring telephone 206. In particular, communication links between three monitoring client telephones 206, a central server 204 and three monitored client telephones 202 are shown in FIG. 2. Whenever a change in status of a monitored client telephone 202 occurs, monitored client telephone 202 communicates the status change via central server 204 to each monitoring client telephone 206 registered to receive status updates of that monitored client telephone 202. It will be appreciated that the number of monitored client telephones 202 and monitoring client telephone 206 shown in FIG. 2 were arbitrarily chosen, and that alternative embodiments of the present invention may include any number of monitored and any number of monitoring client telephones.

One of ordinary skill in the art will understand the benefits of receiving the status of another telephone. For example, teenagers may monitor their friends to determine which of their friends' phone lines are busy. When a teenager wants to call a friend, prior to even picking up and dialing the phone, the teenager automatically knows which friends are available to talk. The teenager may be presented with a list of friends, so that the teenager can instantly see which ones are available. In another example, a mother may want to monitor her home telephone while at work. The mother may be interested in determining whether the phone is busy, or may wish to monitor the amount of time that her son, daughter or babysitter is on the phone per day.

It will also be appreciated that status information may be input at monitored client telephone 202. For example, when a child arrives home, the child may enter a DTMF code into monitored client telephone 202 (e.g., *68). The code representing a status update is sent to central server 204. Central server 204 forwards the status information to the child's mother's monitoring client telephone 206, thereby informing the mother that her child has arrived at home.

In another example, a supervisor may monitor when a telecommuting employee or consultant is working. For instance, the employee or consultant enters a predetermined code into monitored client telephone 202 when arriving at work. Monitored client telephone 202 sends the code to central server 204. Central server 204 searches a DTMF code database 340, as shown in FIG. 7B, retrieving the status corresponding to the code. Once retrieved, central server 204 sends the status to monitoring client telephone 206. The status allows the supervisor to know when to contact the employee or consultant. Alternatively, this embodiment of the invention may provide the supervisor with additional information. For example, accounting and billing processes may calculate the total number of hours the employee worked. The status may also affect the billing rate for the called party. For example, calling a consultant while her status is "unavailable" may result in a higher charge (e.g., a higher hourly billing rate) for that caked time. A billing program may obtain such information as total time with a certain status (e.g., a status of "working") and/or the total time on the phone with a particular status (e.g., "lunchtime") and/or the applicable billing rate or other fee structure. Such a billing program could then generate an appropriate bill based thereon, and output a bill in printed, electronic file, email, fax or other forms. Those skilled in the art will recognize that these examples are provided purely for illustrative purposes and should not be understood to limit the breadth of the invention.

Status information may also be automatically determined by client telephone 202, central server 204, a monitoring client telephone, or any combination of the foregoing whether cooperating or not. For example, the location or approximate location of a phone (e.g., a cellular phone with GPS capability, cellular phones with other location abilities, calculating the Doppler effect of a signal received from a cellular phone) may be ascertained by the central server 204 by, e.g., receiving a signal from the cellular phone that indicates the location or approximate location of the cell phone. Alternatively, the phone may broadcast a signal, which is received by a receiver. The strength and/or time of reception of the signal may allow the central server to determine the distance of the phone from the receiver. The mere fact that a signal is received may also indicate the location of the phone. In certain embodiment, a low strength receiver that receives a signal, or a receiver that receives a signal from a low power transmitter, may indicate that the transmitter is within a certain area. For example, a base unit may be equipped to receive a signal from a handset unit only if the handset is within one hundred feet of the base. In another example, a base unit may readily determine when the handset is physically plugged into the base.

Figure 3:
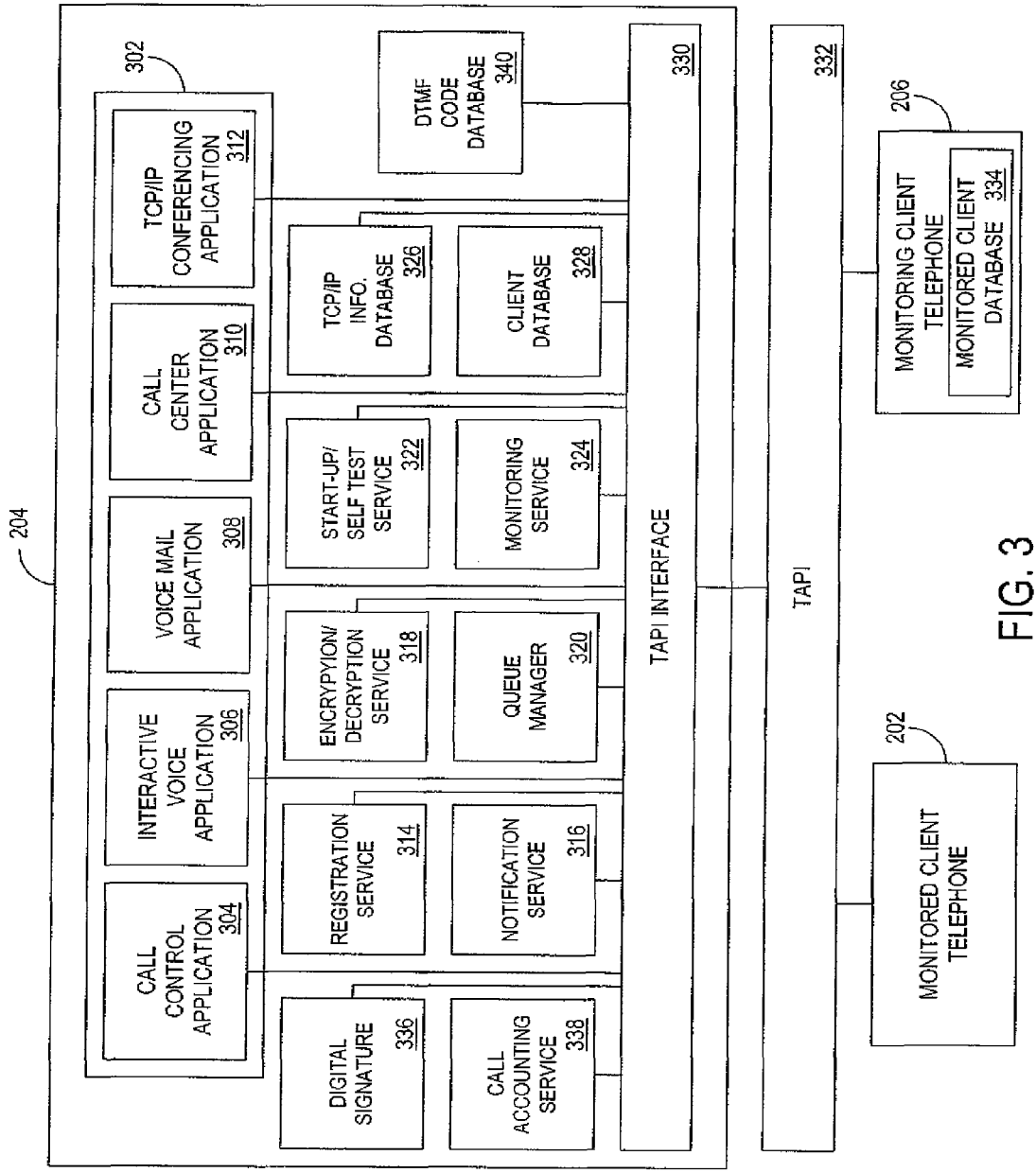
FIG. 3 shows a schematic diagram of a connection between a client telephone of an embodiment of the present invention and a telephony application programming Interface (TAPI).

It is additionally possible to use a plurality of such receivers to more accurately determine the location of the phone through known locating techniques, including but not limited to triangulation. Referring now to FIG. 3, a diagram of a Telephony Application Programming Interface (TAPI) 332 connected to monitoring client telephone 206, monitored client telephone 202 and central server 204 may be generally appreciated. Those of ordinary skill in the art will readily contemplate, based on the present disclosure, other interfaces besides the specific TAPI illustrated in FIG. 3. Central server 204 includes a plurality of communication applications 302 such as a call control application 304, an interactive voice application 306, a voice mail application 308, a call center application 310, and a TCP/IP conferencing application 312. Central server 204 also includes a registration service 314, a notification service 316, an encryption/decryption service 318, a queue manager 320, a start-up/self test service 322, a monitoring service 324, a TCP/IP database 326, a client database 328, a digital signature 336, a call accounting service 338 and a DTMF code database 340. A TAPI interface 330 connects each of the above components to TAPI 332. A detailed description of the services, managers, and databases in conjunction with FIG. 5 will be provided below.

As shown, TAPI 332 enables applications to access all the telephony options available on any machine. For example, the communication applications 302 including call control application 304, interactive voice application 306, voice mail application 308, call center application 310 and TCP/IP conferencing application 312 may access all telephony options available on monitoring telephone 206 and monitored client telephone 202. For instance, the applications may access monitored client database 334 stored on monitoring client telephone 206.

The data on a call is available to applications in a standard manner. TAPI 332 is an architecture that provides simple and generic methods for making connections between two or more machines and provides each machine access to any media stream involved in that connection. TAPI 332 abstracts call-control functionality to provide a common interface to applications that utilize different and seemingly incompatible communication protocols. This interface connects monitored client telephone 202 and monitoring client telephone 206 to central server 204.

Figure 4A:
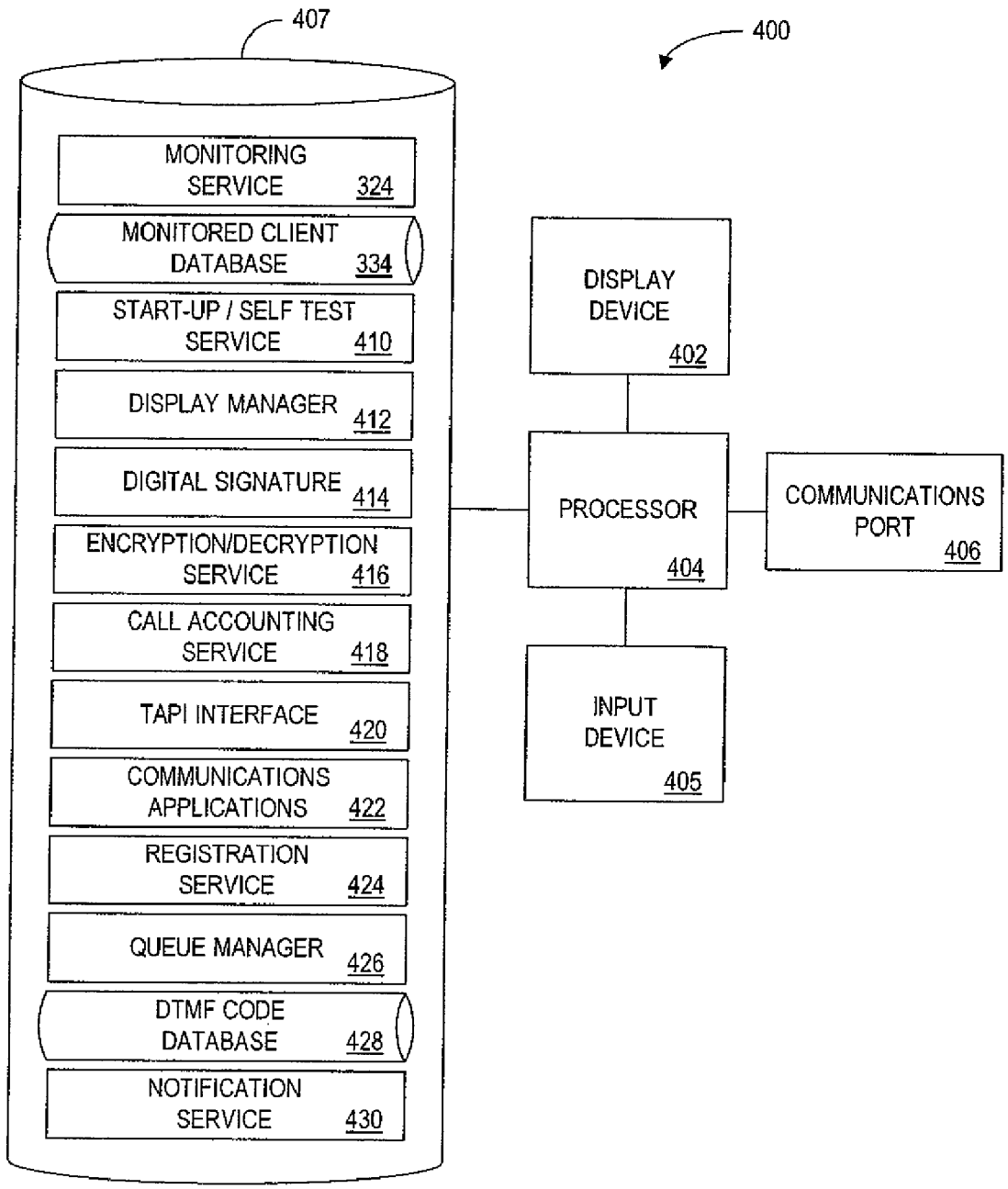
FIG. 4A shows a schematic diagram of a client telephone of an embodiment of the present invention.

Referring now to FIG. 4A, a diagram of a client telephone 400 of an embodiment of the present invention may be better appreciated. One of ordinary skill in the art will recognize that client telephone 400 may comprise either a monitoring client telephone 206 or a monitored client telephone 202. Client telephone 400 may be implemented as one or more separate devices. For example, client telephone 400 may be a single device or comprise a combination such as a telephone in communication with a separate sensor input device which is itself in communication with a separate transmitter device. Many more variations are contemplated by the present disclosure.

Client telephone 400 operates under a multi-tasking, multithreaded operating system platform (e.g., UNIX, or WINDOWS NT by MICROSOFT of Redmond, Wash.). As shown, client telephone 400 includes a display device 402, an input device 405, a processor 404 and a data storage device 407. Processor 404 is connected to a communication port 406 (e.g., network interface).

Input device 405 may comprise a keyboard comprising a plurality of DTMF coded buttons. Alternatively or in addition, input device 405 may comprise a means for receiving other types of input. For example, input device 405 may comprise a GPS receiver for receiving information from a global positioning system. Such a GPS receiver typically receives broadcast signals that allow it to determine latitude, longitude, altitude, and time. Similarly, input device 405 may comprise a receiver that receives various wireless signals such as radio signals or infrared signals. Such receivers may be capable of receiving signals transmitted by cell phones, appliance remote controls such as television remote controls, remote car lock actuators, remote garage door openers, PDAs, and other devices.

Input device 405 may comprise sensors or detectors that detect stimulus such as motion sensors (whether based on Doppler effects or other types of motion sensors), sensors that measure movement or actuation of a door or garage door; electrical sensors that detect activation or deactivation of air conditioners, lights and other devices; general electrical sensors that detect power consumption; weight sensors; temperature sensors; and combinations and equivalents thereof.

Input device 405 may comprise means for detecting the powering up or activation of the client telephone 400. For example, the input device 405 may comprise a detector in communication with a circuit that activates or powers up a device, component of a device or plurality of components of a device. Accordingly, input device 405 may comprise means for detecting the powering up or activation of (i) a telephone, such as a desktop phone, cellular phone or wireless phone; (ii) a computer; or (iii) a television.

Input device 405 may comprise a microphone or other audio reception device, possibly but not necessarily separate from the conventional microphone of a telephone for receiving spoken sounds. Such a microphone can be operational to detect, process and/or transmit sound even if the phone is in an inactive state, such as when it is not in use or when a receiver is cradled.

Display device 402 is an LCD or other type of display that shows the status of each party being monitored by client telephone 400, in accordance with the data stored in monitored client database 334. For example, the display shows a name and the current status of each party being monitored. It will be appreciated that client telephone 400 might not include display device 402.

Communications port 406 provides the network interface to central server 204 using TCP/IP over the D channel on an ISDN telephone line. One of ordinary skill in the art will recognize that the telecommunication specifications are provided purely for illustrative purposes and that alternative embodiments of this invention may include different telecommunication methods.

Data storage device 407 includes a monitoring service 324 that processor 404 executes to provide client digital phone 400 with monitoring functionality. Data storage device 407 also includes a startup/self-test service 410, display manager 412, digital signature 414, encryption/decryption service 416, monitored client database 334, call accounting service 418, a TAPI interface 420, a communications applications 422, a registration service 424, a queue manager 426, a DTMF code database 428, and a notification service 430. The communications applications 422, the registration service 424, the queue manager 426, the DTMF code database 428, and the notification service 430 are utilized by the client telephone 400 in ways similar to those of the corresponding elements of the central server 204, as described below.

Startup/self-test service 410, at startup, tests all hardware of client telephone 400 and loads the operating system and services. If connected via TAPI interface 420 to central server 204, startup occurs when client telephone 400 is powered on. A startup may also occur if a user presses a re-boot key (not shown) located on client telephone 400. Startup/self-test process 410 typically includes three types of tests. It performs a checksum on EPROM, checks the ISDN line to confirm that the link with central server 204 on D and both B channels is up and running, and confirms that a "service provider identification" (SPID) matches the SPID pre-programmed on client telephone 400. A SPID is typically composed of the telephone number of client telephone 400 followed by four additional digits. It will be appreciated that central server 204 assigns client telephone 400 TCP/IP information during the initial connection between client telephone 400 and central server 204, and client telephone 400 subsequently stores that information. It will also be appreciated that, at startup, client telephone 400 sends its TCP/IP information to central server 204, and central server 204 verifies that the TCP/IP information matches the assigned TCP/IP information of client telephone 400. One of ordinary skill in the art will understand that in addition to ISDN, startup/self-test service 410 may be applied to other types of communication technology.

If client telephone 400 is a monitoring client telephone 206, after startup/self-test service 410 is executed by processor 404, monitoring client telephone 206 requests that central server 204 send status updates of the monitored client telephones 202 that it is authorized to receive. Monitoring client telephone 206 seizes the D channel of the ISDN line and sends its DTMF codes. Central server 204 reads the registration information and routes the call to registration service 314 via a communications (e.g., a DS-1 or DS-3) line. One of ordinary skill in the art will recognize that the demand for communication lines at the time central server 204 transmits the code information determines which line is chosen. Registration service 314 senses the incoming call and causes central server 204 to go off-hook on that line. Once off-hook, registration service 314 opens a communication link between central server 204 and monitoring client telephone 206.

Once monitoring client telephone 206 senses that the D channel communication link with central server 204 is established, it builds and encrypts an acknowledgment message with its SPID and a digital signature. Encryption/decryption service 416 of monitoring client telephone 206 uses the public key of central server 204 to encrypt a message and generate a digital signature bundled with the message. Encryption/decryption service 318 of central server 204 uses the private key of central server 204 to decrypt the message and validate the signature. The digital signature provides the security clearance of monitoring client telephone's 206 identity.

If encryption/decryption service 318 of central server 204 successfully decrypts the message and verifies the digital signature of monitoring client telephone 206, central server 204 sends an acknowledgment (ACK) message and its digital signature back to monitoring client telephone 206. If the verification fails, server 204 instead sends a no-acknowledgment (NAK) and its digital signature back to monitoring client telephone 206 and drops the line. If monitoring client telephone 206 receives an ACK, it verifies the digital signature of central server 204. If the verification is a success, monitoring client telephone 206 returns an ACK message to server 204. If the verification fails, monitoring client telephone 206 returns a NAK message to server 204 and drops the line. If the communications between central server 204 and monitoring client telephone 206 resulted in ACKs, a session is established between monitoring client telephone 206 and registration service 314 of central server 204.

Registration service 314 queries client database 328 to confirm that the account of monitoring client telephone 206 is in good standing. Although not shown, a preferred embodiment of client database 328 may include client billing and account information. It will be appreciated that the telephone company will typically provide the status monitoring service only to clients that have paid their telephone bills. Registration service 314 then sends a clear to send (CTS) message to monitoring client telephone 206 that it is ready and waiting. Monitoring client telephone 206 receives the message and creates and sends a monitor message (MM) to registration service 314. Registration service 314 receives the message and queries client database 328 to obtain the current status of the monitored client telephones 202 that monitoring client telephone 206 is authorized to receive. Alternatively, the message from monitoring client telephone 206 may include a request for a status update of specific monitored client telephones 206.

After entering the appropriate status information into a message, registration service 314 uses the public key of monitoring client telephone 206 to encrypt the message, and return the message. Monitoring client telephone 206 receives the message and decrypts it with its private key.

Monitoring client telephone 206 then updates monitored client database 334 and outputs the status of each party. Monitoring client telephone 206 then sends a message to registration service 314 of central server 204 acknowledging successful receipt of the status updates. Call accounting service 338 updates client database 328 to bill for the successful inquiry and drops the session by clearing the channel. Monitoring client telephone 206 recognizes that the channel is down and enters into a wait state until notification service 316 sends it updated status information. One of ordinary skill in the art will recognize that once monitoring client telephone 206 restarts and resets with status updates of monitored client telephones 202, monitoring client telephone 206 begins to automatically receive status updates without the need to poll central server 204.

Monitored client database 334 includes monitoring information stored on storage device 407 of client telephone 400. See FIG. 6 for an exemplary view of monitored client database 334. As shown, the monitoring information includes monitored client SPID 602, monitored client name 604 and status 606 of the monitored client. It will be appreciated that alternative embodiments of this invention may include other varied types of monitoring information. For example, monitored client database 334 may also include information such as total number of hours a monitored phone is busy, or total number of hours that a monitored telephone of an employee had an associated status of "working".

Display manager 412 accesses monitored client database 334, and displays this information on display device 402 of client telephone 400 (if display is the method of outputting status). Display manager 412 may also display messages originating from central server 204. For example, display manager 412 may receive and display messages from central server 204 during registration of client telephone 400.

Digital signature 414 provides client digital telephone 400 with the ability to verify the identity of a sender of TCP/IP message packets by creating and utilizing private and public keys. Digital signature 414 is included with encrypted messages sent between client telephone 400 and central server 204. At client telephone 400, the recipient's public key is used to encrypt a message and generate a digital signature string that is bundled therein. Upon receipt of the message, the recipient, such as central server 204 or another client telephone 400, uses its private key to decrypt the message and validate the signature. Validating the signature verifies the message sender's identity.

Call accounting service 418 on client telephone 400 maintains up-to-date billing information. For example, call accounting service 338 of central server 204 sends telephone usage and billing updates to client's telephone 400 and stores the updates on storage device 407. In response to a subscriber's request, display manager 412 accesses and displays the information on display device 402. It will be appreciated that central server 204, in an embodiment of this invention, routinely initiates the transmission of accounting information to call accounting service 418. In still another embodiment, call accounting central service 418 retrieves telephone usage and billing updates from central server 204 in response to a request from the subscriber of client telephone 400.

Figure 4B:
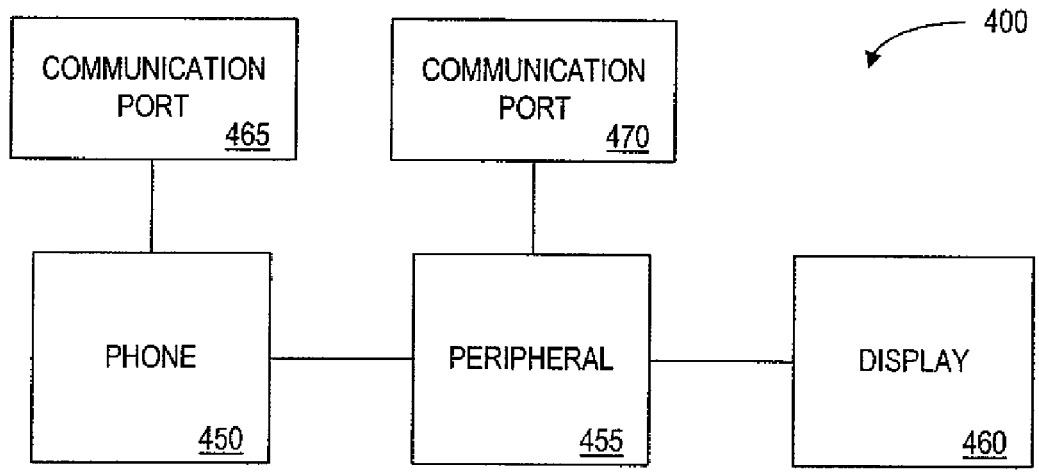
FIG. 4B shows a schematic diagram of a client telephone of another embodiment of the present invention.

FIG. 4B illustrates an embodiment of client telephone 400. A phone 450 is in communication via wire or wireless medium with a peripheral 455, which is in turn in communication via wire or wireless medium with a display 460. Display 460 may comprise any device for presenting information visually, such as an LCD (liquid crystal display), monitor, or similar device. The functionality of the embodiments of the present invention may be distributed among the phone 450, peripheral 455 and display 460 in an appropriate manner as would be apparent to one of ordinary skill in the art. For example, peripheral 455 may comprise a computer or similar computing device.

A communication device 465 permits the phone 450 to transmit and receive signals. Communication device 465 may comprise means for transmitting and receiving data over a cable, wire or similar medium, as might be appropriate for a desktop phone. Alternatively, communication device 465 may comprise means for transmitting and receiving data wirelessly via infrared, radio or similar signals, as might be appropriate for a cellular phone or other wireless device. In one embodiment, peripheral 455 and display 460 may compose an integral unit which is adapted to be connected to phone 450. For example, an integral unit may comprise a single casing which encloses therein the peripheral 455 and the display 460, while the casing defines an opening allowing a portion on the viewable area of the display to be seen outside the casing.

Such an integral unit, or at least one of the individual peripheral and display, may be fitted to the phone 450 and detachably held thereto by the shape of the integral unit relative to the phone 450. Alternatively, fitting to the phone detachably holding thereto may be accomplished by a fixing means such as a snap or similar means. Physical contact need not be required for communication between the phone 450 and the peripheral 455.

Figure 5:
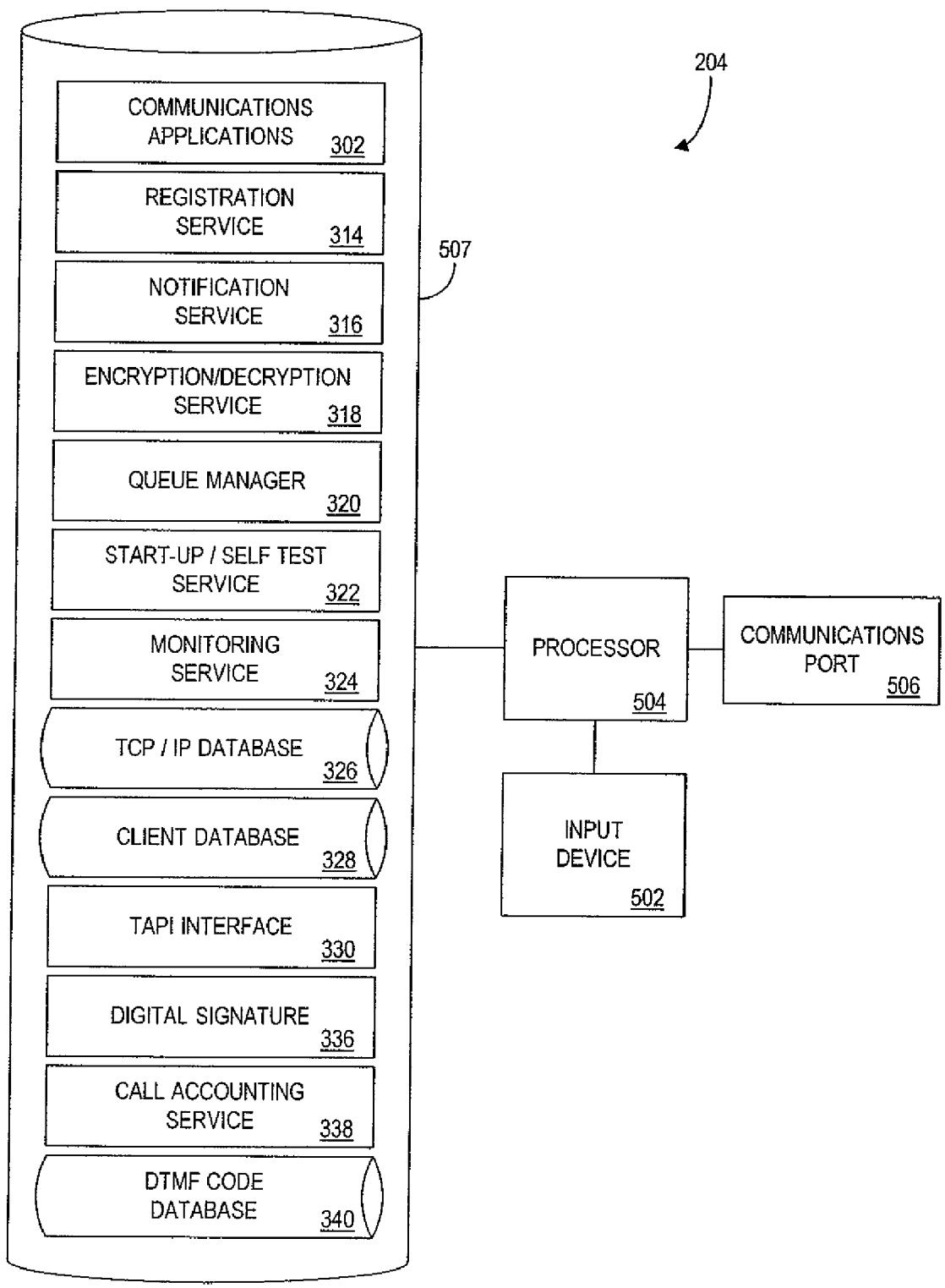
FIG. 5 shows a diagram of a central server in accordance with the digital phone monitoring system of FIG. 2.

Referring now to FIG. 5, a diagram of central server 204 may be better appreciated. Central server 204 operates under a multi-tasking, multithreaded operating system platform (e.g., UNIX, or WINDOWS NT by MICROSOFT of Redmond, Wash.). As shown, central server 204 includes an input device 502 (e.g., CD ROM or floppy disk drive, keyboard), processor 504 connected to a communications port 506, and a storage device 507. Communications port 506 provides a network interface, using TCP/IP over the D channel on an ISDN telephone line to connect central server 204 to monitored client telephone 202 and to monitoring client telephone 206. One of ordinary skill in the art will recognize that the telecommunication specifications are provided purely for illustrative purposes, and that alternative embodiments of this invention may include different types of telecommunication methods.

Storage device 507 includes monitoring service 324, TAPI interface 330, encryption/decryption service 318, start-up/self-test service 322, queue manager 320, notification service 316, registration service 314, client database 328, TCP/IP information database 326, communication applications 302, call accounting service 338, digital signature 336 and DTMF code database 340. Monitoring service 324 provides central server 204 with a monitoring process in accordance with various embodiments of the present invention. TAPI interface 330, as discussed above, enables applications, such as monitoring service 324, to access all the telephony options available on any client telephone. For example, it provides monitoring service 324 with access to updated monitored client database 324 stored on client telephone 400.

Encryption/decryption service 318 employs private and public keys to respectively decrypt and encrypt messages that are sent to client telephone 400. This process also employs a digital signature 336 to verify the message sender's identity. Central server 204 receives a digital string encrypted with a message from client telephone 400. Upon receipt of the message, central server 204 uses its private key to decrypt the message and validate digital signature 336. Similarly, when central server 204 sends a message to client telephone 400, central server 204 utilizes the public key of client telephone 400 to encrypt the message and generate a digital signature string that is bundled therein. Client telephone 400 uses its private key to decrypt the message and validate the server's identity.

Startup/self-test service 322 initializes all components at startup and checks predetermined parameters when booting up. Tests include confirming that the ISDN line over D and both B channels that connect central server 204 and client telephones 400 is operating within predetermined parameters, and verifying that incoming messages to central server 204 are originated from authorized SPIDs. For example, at startup, startup/self-test service 410 of client telephone 400 sends a SPID verification message to central server 204. Startup/self-test service 322 of central server 204 verifies that the SPID is authorized to receive monitoring information.

Registration service 314 registers monitored client telephones 202 and monitoring client telephones 206, and maintains a list of current accounts and a list of the active connections between subscribers. Registration service 314 stores the list of current accounts on client database 328 and stores the list of active connections on TCP/IP information database 326. FIG. 7 shows an example of client database 328, and FIG. 8 shows an example of TCP/IP information database 326.

If the status of monitored client telephone 202 changes, notification service 316 receives a status information update. Notification service 316 notifies queue manager 320 to transmit the status update to the appropriate monitoring client telephones 206. Queue manager 320 receives notification of the status change from notification service 316, queries client database 328 for the appropriate SPID(s) to contact, and transmits an indication of the change in status to the authorized clients designated by the appropriate SPID(s).

Call accounting service 338 maintains and sends billing information in real time to each client. More particularly, call accounting service 338 sends accounting and billing information in update packets to the client's telephone either (i) periodically (e.g., daily), or (2) in response to a client request. Accordingly, a client can always view in real time the specific charges associated with a call or view the running total for monthly bill. It will be appreciated that call accounting service 418 employed by client telephone 400 provides a subscriber with numerous functions for viewing and processing specific charges.

Referring now to FIG. 6, a diagram of an exemplary monitored client database 334 stored within monitoring client telephone 206 may be better appreciated. As shown, each entry of monitored client database 334 specifies a monitored client telephone 202 that is assigned to send status information to a monitoring client telephone 206. In an exemplary embodiment of the present invention, monitored client database 334 includes, for each party being monitored, a monitored client SPID 602, a monitored client name 604, and the current status 606 of monitored client telephone 202. It will be appreciated that for a given monitored client SPID 602, monitoring client telephone 206 may monitor more than one status. For example, the last entry 607 of monitored client database 334 includes more than one status.

A number of methods are available to enter data into monitored client database 334. For example, in one method, a client using input device 405 locally inputs monitored client SPIDs 602, and corresponding monitored client names 604 into monitored client database 334. In an alternative method, central server 204, in response to a request from monitoring client telephone 206, remotely updates the SPIDs of monitored client database 334.

A client requests status monitoring by either calling a telephone company's toll-free number to verbally request monitoring, or by electronically submitting a request via an Interactive Voice Response (IVR) unit. It will be appreciated that a Voice Response Unit (VRU) may also be used. However, before monitoring of a particular SPID occurs, central server 204 must receive permission from the party at monitored client telephone 202. The central telephone office requests permission by electronically sending a request via central server 204 to monitored client telephone 202, or by contacting the party using another method. Other methods may include, for example, a telephone call, an e-mail, or a letter. If central server 204 receives permission, it sends an authorizing signal to monitoring client telephone 206. Once authorized, monitoring client telephone 206 receives status updates from central server 204, and enters the updates into monitored party database 334. Display device 402 of the monitoring client telephone 206 displays each status update 606.

Alternatively, monitored client telephone 202 may initiate the request to be monitored by monitoring client telephone 206. When central server 204 electronically receives the request, or the central telephone service receives the request using another manner, the service requests permission to send monitoring client telephone 206 status updates of monitored client telephone 202. As discussed above, the request for permission may be electronically submitted by central server 204 or provided using another manner.

It will be appreciated that a subscriber at monitoring client telephone 206 may monitor a status change of a particular predetermined condition. For example, a subscriber may choose to monitor the "busy" status of monitored client telephone 202. Alternatively, a subscriber may choose to monitor when the person at monitored client telephone 202 enters a DTMF code indicative of a working status. One of ordinary skill in the art will recognize that these examples are purely illustrative of different status changes, and that alternative embodiments of the present invention may include status changes of other predetermined conditions.

Referring now to FIG. 7(A), a diagram of an exemplary client database 328 stored on central server 204 may be better appreciated. As shown, this database includes entries for each monitored client telephone 202 that is registered with central server 204. Each entry includes the party being monitored, identifiable by monitored client SPID 702, the party receiving the status updates, identifiable by monitoring client SPID 704, and the particular status changes monitoring client telephone 206 will receive, shown as monitored status 706 and a current status 708. It will be appreciated that the current status 708 of an entry of client database 328 may include more than one status. The process of updating and maintaining client database 328 will be discussed in conjunction with the description of the registration process shown in FIG. 9.

Referring now to FIG. 7(B), a diagram of exemplary DTMF code database 340 stored at central server 204 may be better appreciated. As shown, this database includes a status 714 assigned to each DTMF code 712. Notification service 316 of central server 204 uses DTMF code database 710 to translate incoming DTMF codes to an appropriate status. It will be appreciated that a DTMF code may represent information other than a status. For example, a DTMF code may represent a request for billing information.

Referring now to FIG. 8, a diagram of exemplary TCP/IP information database 326 stored at central server 204 may be better appreciated. As shown, this database includes entries for each client telephone 400 registered with central server 204. Each entry includes a SPID address 802 and a corresponding TCP/IP address 804. A TCP/IP address information 804 is issued to each client telephone 400 registered with central server 204. It will be appreciated that central server 204 communicates with other nodes and clients based on their assigned TCP/IP address 804. One of ordinary skill in the art will recognize that the header portion of messages sent between monitored and monitoring client telephones 400 and central server 204 typically include a TCP/IP address 804. When receiving or sending a message, central server 204 uses the SPID address 802 listed in the TCP/IP database 326 to verify that the TCP/IP address included within the message's header portion is correct.

Figure 9:
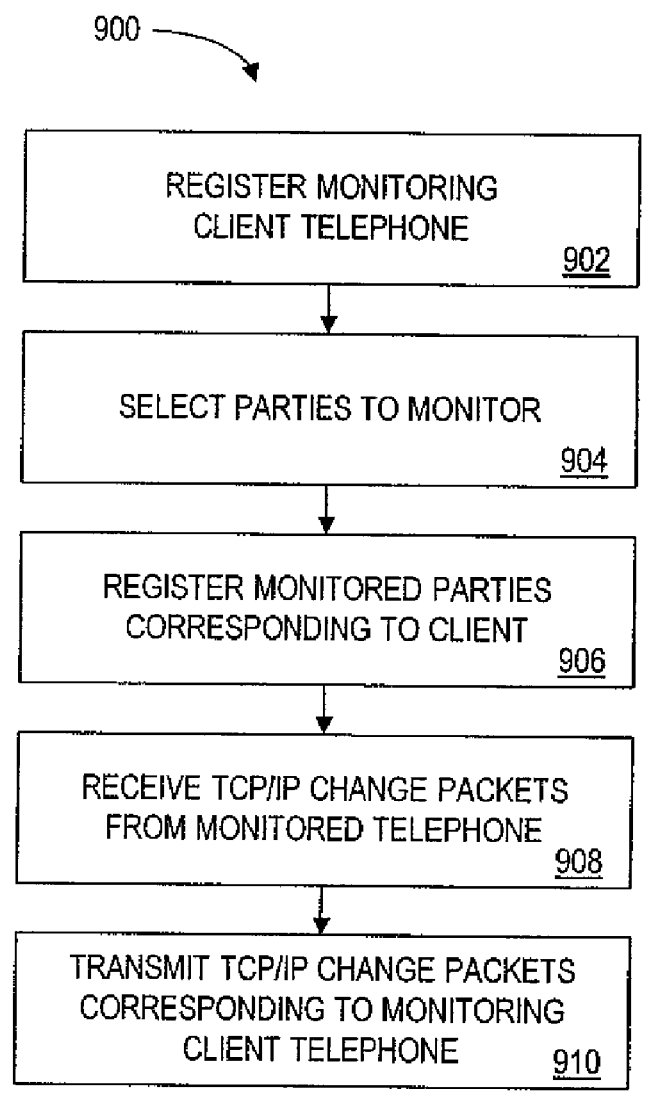
FIG. 9 shows a flowchart of the notification process performed by a central server.

Referring now to FIG. 9, a flowchart of a status monitoring process 900 may be generally appreciated. As shown, in step 902, central server 204 registers the subscriber of monitoring client telephone 206. In step 904, the subscriber of monitoring client telephone 206 selects the parties the subscriber wishes to monitor. In step 906, central server 204 registers the parties to be monitored. It will be appreciated that prior to registering these parties, central server 204 may request each party's permission to be monitored by the subscriber of monitoring client telephone 206. In step 908, central server 204 receives TCP/IP packets from monitored client telephone 202. In step 910, central server 204 transmits the TCP/IP packets to the monitoring client telephone 202 configured to receive the status updates. Once received, monitoring client telephone 206 displays the status to the subscriber. One of ordinary skill in the art will recognize that FIG. 9 shows the general steps of an embodiment of the present invention, and that FIGS. 10-12 described below will explain each step in greater detail.

It will be appreciated that in alternative embodiments of the present invention, monitored client telephone 202 may register prior to monitoring client telephone 206. Furthermore, monitored client telephone 202 may select the parties that it wishes to provide status updates. Prior to sending the status updates, monitoring client telephone 206 must register and provide central server 204 of the central telephone permission to receive the status information.

When a party at a client telephone 400 wishes to register as a subscriber of a monitored client telephone 202 in step 906, or as a monitoring client telephone 306 in step 902, client telephone 400 seizes the D channel of the ISDN line and sends the registration information to central server 204 of a telephone station's central office. Central server 204 reads the registration information and routes the call to registration service 314 via a DS-1 or DS-3 line. One of ordinary skill in the art will recognize that the demand for communication lines at the time central server 204 transmits the code information determines which line is chosen. Registration service 314 senses the incoming call and central server 204 goes off-hook on that line. Once off-hook, registration service 314 opens a communication link between central server 204 and the party wishing to register.

The request for a party's permission to be monitored by the subscriber may be accomplished in a variety of ways. The party may affirmatively register his willingness to be monitored, whether or not a request for permission has been directed to him. Accordingly, a subscriber need not select parties to monitor—the parties may indicate that they are to be monitored.

For example, the party may enter an indication of one or more subscribers that are authorized to monitor the party. Such an indication may be entered via a phone, for example, by actuating numeric keys (e.g., on input device 405) to indicate the phone number of such authorized subscribers. Such an indication may also be entered via a phone, for example, by communicating with a VRU (Voice Response Unit). Such a method of entry could be performed via any public or private phone, whether or not the that phone had other capabilities described herein. An indication of one or more subscribers that are authorized to monitor the party may be entered via a computer communicating with a web site, which in turn provides the information to, e.g., central server 204.

The indication of subscribers that are authorized to monitor the party may be made automatically without much or any input from the party. For example, the party may set or accept a threshold such that people the party calls (or people that call the party) more than the threshold are authorized to monitor the party.

Many other methods of entry, and many other types of devices used in such entry, will be apparent to those of ordinary skill in the art.

A list of one or more subscribers that are authorized to monitor the party may be stored locally on the party's phone or other device and/or stored remotely on central server 204.

Various parties may be authorized to monitor only certain kinds of statuses of a particular monitored party. For example, a first group may be authorized to monitor all statuses of a particular party, while a second group may be authorized to monitor only certain statuses of that party. In another embodiment, various parties may be able to attain different levels of access by paying. For example, telemarketers and other businesses may be able to pay to ascertain certain statuses of a party. The status of a monitored party may be employed as a "block" against certain calls. In certain embodiments, it is not necessary for a monitoring party to register at all. The block applies to certain callers or all callers, irrespective of whether any party registered in any way to receive status. In one embodiment, a status may simply indicate that no calls are allowed to get through to the monitored party (i.e. all calls blocked). In another embodiment, a status may indicate that only certain people are blocked, or that only certain people are unblocked (i.e. may call).

In some embodiments, certain parties may be allowed to always get through a block. For example, it may be desirable for the monitored party to always permit a spouse and parent to circumvent a block. In always granting such parties access, their phones could be always granted access to the monitored party (e.g., by receiving an identifying signal (e.g., ANI, SPID) from such phone and comparing that signal with a list of authorized phones), or those parties could be provided with special access codes. Upon calling the monitored party when a block is in effect, the party would enter the access code and be granted access by allowing there call to get through.

A monitoring party that attempts to call the monitored party but is "blocked" may, e.g., receive a busy signal, receive a particular kind of busy signal, or receive a particular audio message.

Certain locations or certain times may be marked as "blocked", thereby preventing some or all calls from going through. For example, from a phone which has a location that may be determined, a party may enter a code that indicates the current location as a "blocked" location or a location where a certain status is to be established. For example, a party may enter an office building and enter a code via a wireless phone. This could establish a status of "unavailable" while the party is in the building.

The location of the phone upon entry of the code may be determined, such that, e.g., that location alone is an area in which the status would be established as "unavailable". Optionally, a radius may be set such that when the phone is within the radius of that location the status would be established as "unavailable". Such a radius may be predetermined, or alterable (e.g., by the party).

As described herein, once the status changes, for example, if a party moves out of an office building previously marked as having a status of "unavailable", an email, message or other transmission may be automatically sent to monitoring parties.

In one embodiment, a group of certain parties may be established, and a member of the group may determine who in the group is calling another, and who is free. The identity of those called by other group members may or may not be made available.

In certain embodiments, establishing such a group can allow a member of the group to sort a list of the other members in order of, e.g., frequency of calls to the parties, frequency of calls from the parties, frequency of calls to or from the parties and/or frequency of calls from the parties to any member of the group.

In certain embodiments, it can be advantageous to rate members of the group based on, e.g., calls with others, calls to other customers on the phone network provider (e.g., Verizon) or calls with other members of the group. The rating may be based on, e.g., number of such calls, duration of such calls. A rating according to this embodiment may confer rewards such as discounted or free products, discounted or free services from the phone network provider. The rank may be displayed or otherwise made known to member of the group, conferring psychological rewards or penalties upon members.

In one embodiment, a group of members may eavesdrop on other members who are communicating with one another via, e.g., voice, text messaging. Such eavesdropping may be automatically allowed, or may require permission from those engaged in communicating. It may also be advantageous to allow members of the group to access a "log" of prior communication (e.g., recorded voice, recorded text messages) to allow eavesdropper to catch up on what had been communicating prior to eavesdropping.

Figure 10:
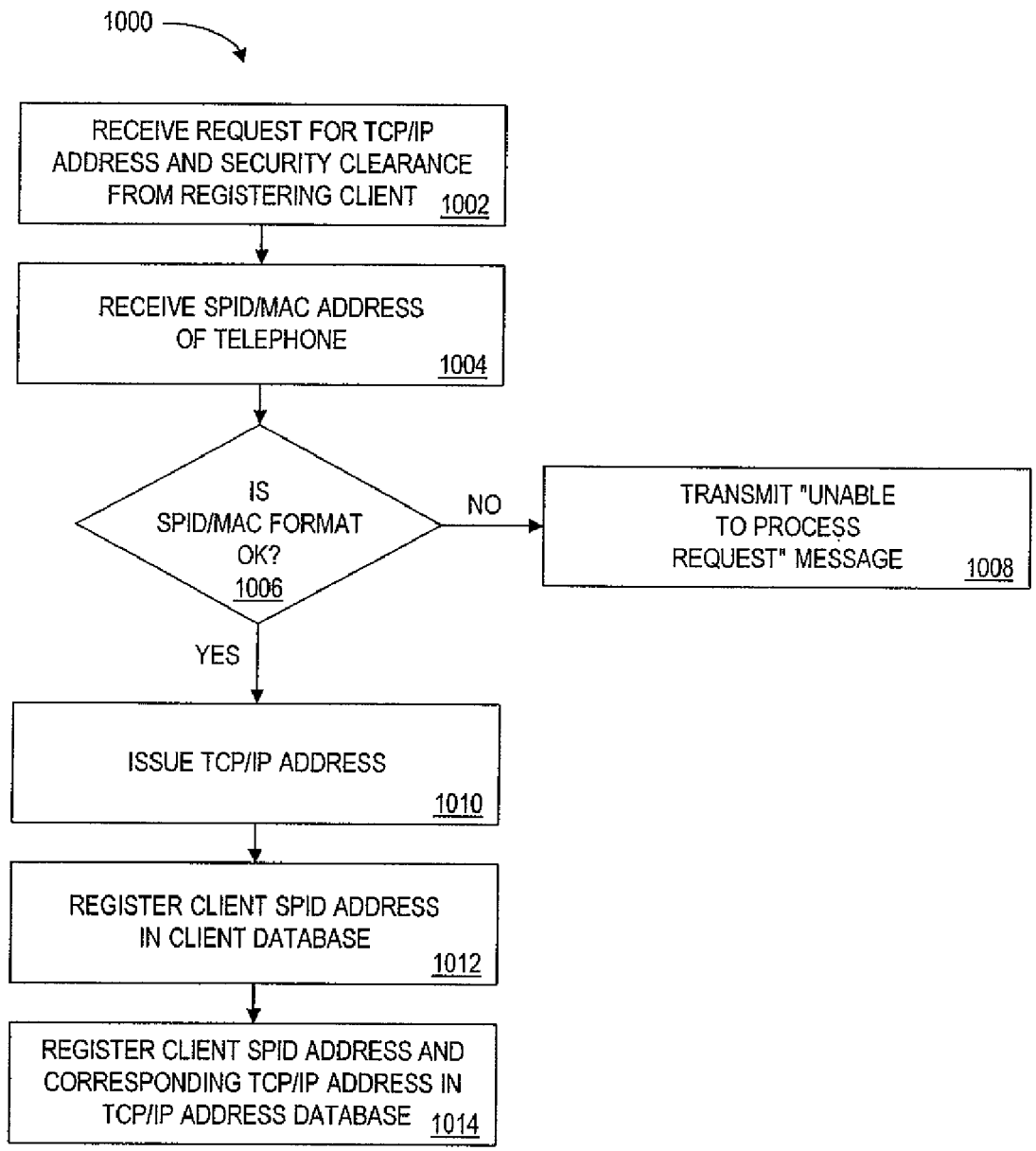
FIG. 10 shows a flowchart of the registration performed by a central server.

Referring now to FIG. 10, the registration process performed by registration service 314 of central server 204 may be better appreciated. In step 1002, registration service 314 receives a request from a registering client telephone 400 for a TCP/IP address and a security clearance. The security clearance process utilizes a digital signature and encryption to secure the messages sent between client telephone 400 and central server 204. More particularly, once client telephone 400 senses that the D channel communication link with central server 204 is established, it builds and encrypts an acknowledgment message with its SPID and a digital signature.

Client Telephone 400 uses a public key of central server 204 to encrypt a message and generate a digital signature bundled with the message. The recipient of the message uses its private key to decrypt the message and validate the signature. The digital signature provides the security clearance of the message sender's identity. It will be appreciated that all communications between central server 204 and client telephone are encrypted and include a digital signature.

At registration, if encryption/decryption service 318 decrypts the message and verifies the digital signature of client telephone 400, central server 204 sends an acknowledgment (ACK) message and its digital signature back to client telephone 400. If the verification fails, central server 204 instead sends a no-acknowledgment (NAK) and its digital signature back to client telephone 400 and drops the line. If client telephone 400 receives an ACK, it verifies the digital signature of central server 204. If the verification is a success, client telephone 400 returns an ACK message to central server 204. If the verification fails, client telephone 400 returns a NAK message to central server 204 and drops the line. If these communications resulted in ACKs, a session is established between client telephone 400 and registration service 314 of central server 204.

In step 1004, registration service 314 receives a SPID/MAC (Media Access Control Layer) address from registering client telephone 400. It will be appreciated that the SPID/MAC was either pre-programmed into registering client telephone 400 or was previously assigned by central server 204. In step 1006, registration service 314 checks the SPID/MAC format. In step 1008, if the format is incorrect, registration service 314 sends an "unable to process request" message to client telephone 400. If the format is correct, in step 1010, registration service 314 issues client telephone 400 a TCP/IP address.

In step 1012, registration service 314 stores the SPID of client telephone 400 into the appropriate field of client database 522. If client telephone 400 is a monitored client telephone 202, registration service 314 stores the SPID as a monitored client SPID 702. If client telephone 400 is a monitoring client telephone 206, registration service 314 stores the SPID as a monitoring client SPID 704. In step 1014, registration service 314 stores the SPID address and the corresponding TCP/IP address in TCP/IP address database 326. Once client database 328 and TCP/IP address database 326 are updated, registration service 314 sends a registration acknowledgment message back to client telephone 400 indicating that it is now registered.

After client telephone 400 registers as a monitoring client telephone 206, in step 904, the subscriber of client telephone 400 selects one or more parties that the subscriber wishes to monitor. At monitoring client telephone 206, the subscriber may enter each parties' phone number into monitored client database 334, where each parties phone number is mapped to a SPID. Once entered, monitoring client telephone 206 sends these telephone numbers to registration service 314. Alternatively, the subscriber may also select parties to monitor by contacting the service associated with registration service 314 off-line, and submitting a request to monitor the specified parties.

Once registration service 314 receives the request to monitor one or more parties, registration service 314 verifies that the parties agree to be monitored. If a party is a current subscriber of the status monitoring service, registration service 314 of central server 204 may electronically send the permission request directly to that party's client telephone 400. Alternatively, if a party is not a current subscriber, the central service may verify that the party agrees to be monitored by contacting that person off-line (e.g., via telephone call, postal mail, e-mail).

If the party agrees to be monitored by the subscriber of monitoring client telephone 206, in step 906, registration service 314 registers the monitored party which the subscriber selected. It will be appreciated that if the party agrees to be monitored and does not currently included as an entry within the TCP/IP information database 326 of central server 204, registration service 314 registers this party by performing the steps of the registration process described above and shown in FIG. 10. For all monitored parties, registration service 314 updates client database 328 with each party's monitored client SPID 702, the status 706 being monitored, and the monitoring client SPID 704 of the subscriber who will receive the status updates of the monitored client.

Once client database 328 and TCP/IP information database 326 includes the appropriate identifiers assigned to each new party to be monitored, registration service 314 sends an indication to monitoring client telephone 206 that the parties agreed to be monitored and are registered at central server 204. It will be appreciated that a number of methods exist to update monitoring client telephone 206 with the SPIDs of the parties that will be monitored. For example, in one method, central server 204, in response to a request from monitoring client telephone 206, remotely updates monitored client database 334 with the SPIDs 602 and the corresponding monitored client names 604. In an alternative method, the subscriber locally inputs monitored client SPIDs 602, and corresponding monitored client names 604 into monitored client database 334.

Figure 11:
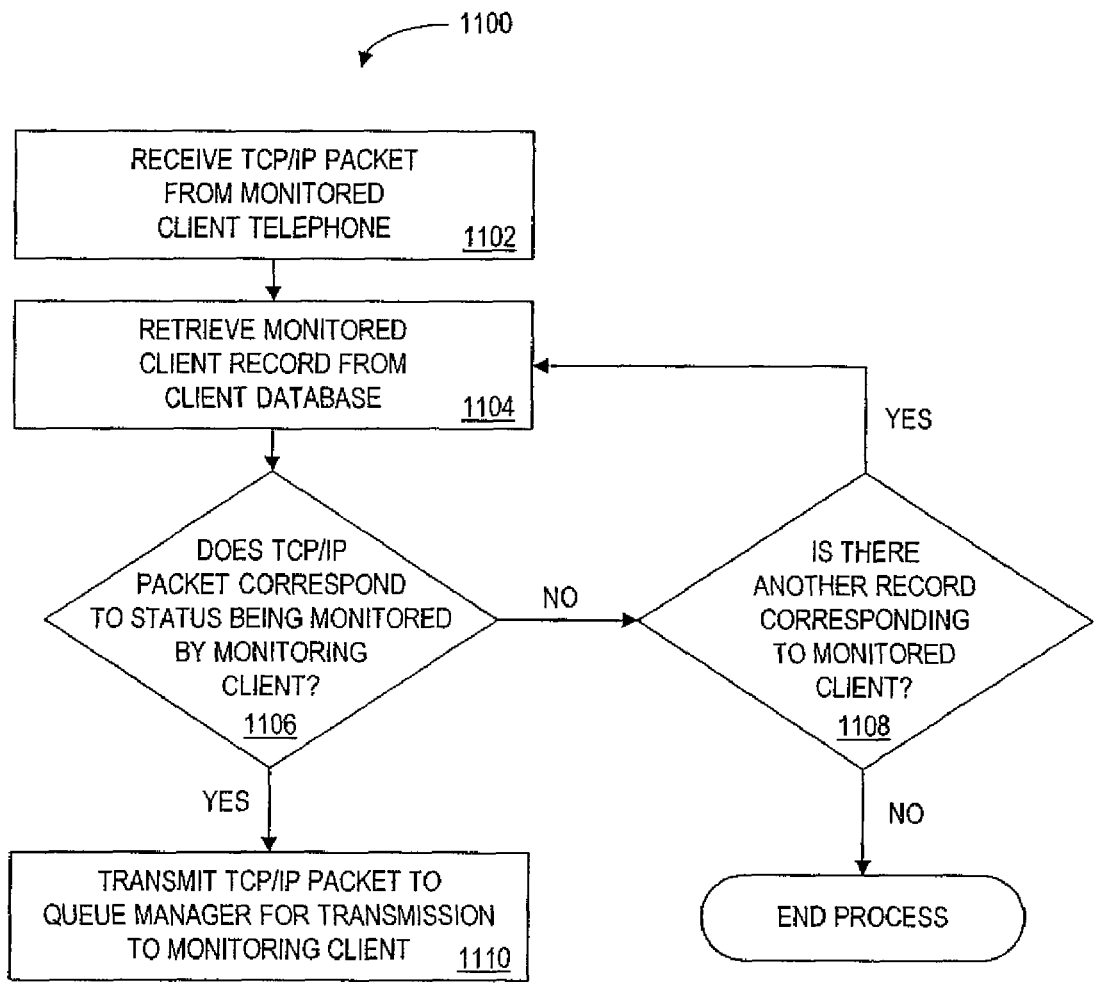
FIG. 11 shows a flowchart of the notification process performed by a central server.

Referring now to FIG. 11, a notification process 1100 performed by notification service 316 of central server 204 may be better appreciated. Once registration service 314 registers the monitoring and monitored parties, monitored client telephone 202 automatically sends status updates via central server 204 to the subscriber of monitoring client telephone 206. Monitored client telephone 202 sends each status update in a TCP/IP packet when its status changes.

It will be appreciated that the status change may be a DTMF code entered by the monitored party into monitored client telephone 202. For example, a party when working may enter a DTMF code. It will also be appreciated that when a first monitored party initiates a call to a second monitored party, monitored client telephone 202 of the first monitored party will submit status updates of both parties to central server 204. Furthermore, the status update may show that the first monitored party is electronically connected to the second monitored party.

Prior to sending a packet of status updates, monitored client telephone 202 uses a public key of central server 204 to encrypt and provide a digital signature within the TCP/IP packet. In step 1102, notification service 316 of central server 204 receives the encrypted TCP/IP packet from monitored client telephone 202. Notification 316 service uses the private key to decrypt and verify the packet's digital signature. Notification service 316 also compares the SPID and TCP/IP address information provider in the header portion of the TCP/IP packet to the appropriate entry in the TCP/IP database 326 to verify the source of the status update. Once the source of the update is verified, notification service 316 stores the status to current status 708 of the appropriate record(s).

In step 1104, notification service 316 queries client database 328 to retrieve a record that includes monitored client telephone 202. In step 1106, notification service 316 determines if this record applies to the status update it received. More specifically, it determines if this status update corresponds to the status information that monitoring client telephone 206 is configured to receive. If the status corresponds, in step 1110, notification service 316 transmits the TCP/IP packet to queue manager 320. If the status does not correspond, in step 1108, notification service 316 determines if there is another record corresponding to monitored client telephone 202. If there is another record, notification service 316 determines if this record applies to the status update it received from monitored client telephone 202. It will be appreciated that this process continues until notification service 316 reviews all records of client database 328 that apply to monitored client telephone 202. Once the review of client database 328 records is completed, in step 1112, notification process 1100 ends.

Figure 12:
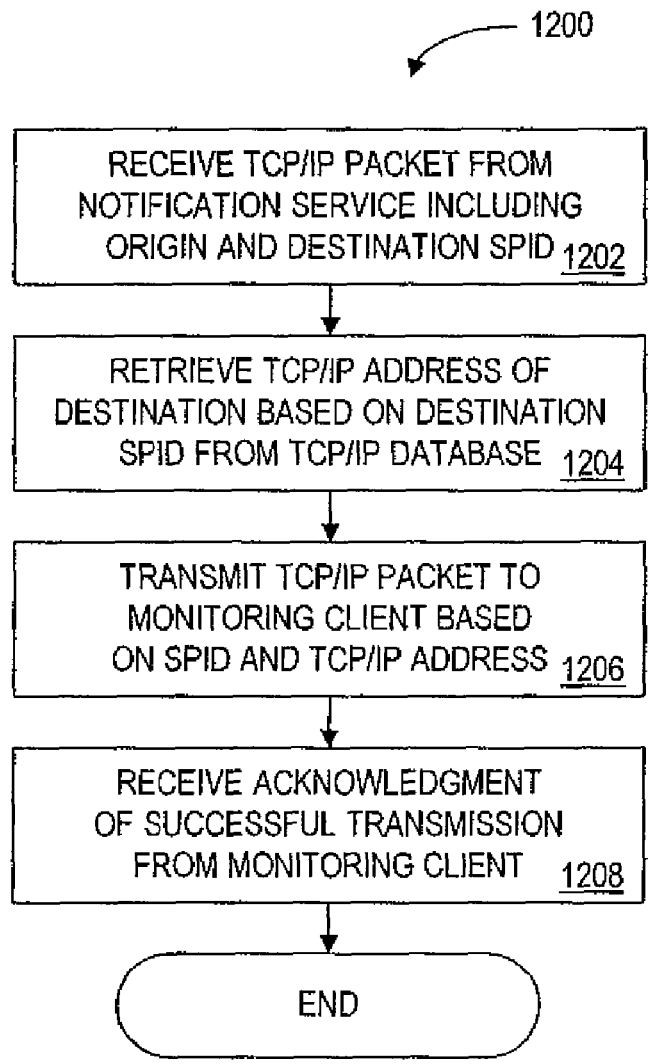
FIG. 12 shows a flowchart of the queue manager process performed by a central server.

Referring now to FIG. 12, a queuing process 1200 performed by queue manager 320 of central server 204 may be better appreciated. The process begins in step 1202 when queue manager 320 receives a TCP/IP packet from notification service 316. This packet includes a status update, and an origin and a destination SPID of respective monitored client telephone 202 and monitoring client telephone 206. In step 1204, queue manager 320 retrieves from TCP/IP address database 326 the TCP/IP address of monitoring client telephone 206 that corresponds to the destination SPID. In step 1206, queue manager 320 transmits the TCP/IP packet to the TCP/IP address of the appropriate monitoring client telephone 206. In step 1208, if monitoring client telephone 206 successfully received the TCP/IP packet, queue manager 320 receives an acknowledgment of the successful transmission. Queue manager 320 updates client database 328 for billing purposes and drops the session with monitoring client telephone 206.

It will be appreciated that all communications between central server 204 and each client may be encrypted. For example, the TCP/IP information that monitoring client telephone 206 receives is encrypted. Monitoring client telephone 206 uses its private key to decrypt and access the status update provided in the TCP/IP packet. Of course, one of ordinary skill in the art will understand that the communications do not necessarily have to be encrypted. Monitoring client telephone 206 updates monitored client database 334 with the status update. Display manager 412 of monitoring client telephone 206 displays the status update on display device 402. Accordingly, the subscriber of monitoring client telephone 206 is capable of monitoring the status of the parties of monitored client telephones 202 without even picking up the telephone.

Figure 13:
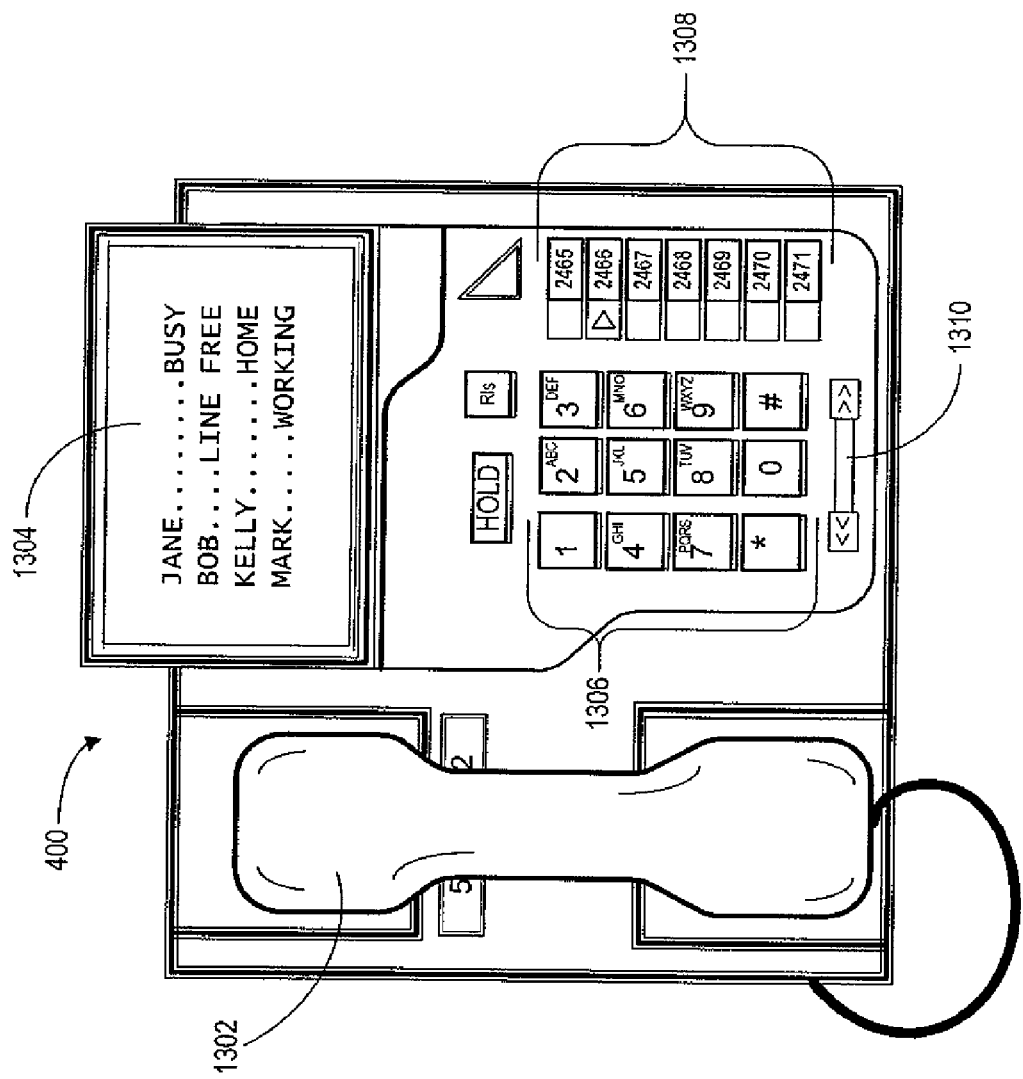
FIG. 13 shows a diagram of an embodiment of a client telephone.

Referring now to FIG. 13, an embodiment of client digital phone 400 may be better appreciated. As shown, client digital phone 400 includes a handset 1302, an LCD display 1304, DTMF buttons 1306, extension status indicators 1308 and a volume control 1310. The screen of sample LCD display 1304 shows the current status of the parties of monitored client telephones 202. One of ordinary skill in the art will recognize that the four parties shown on LCD display 1304 are purely illustrative of the status information provided to subscribers, and that any number of parties of monitored client telephones 202 may be displayed. If the number of monitored parties requires more display space than is available on LCD display 1304, the status entries may continuously scroll. Alternatively, client telephone 400 may include scrolling buttons, that allow a subscriber to scroll though pages of client digital phones 400 that are being monitored.

It will be appreciated that an alternative embodiment of the present invention may utilize the Internet and other networks to transfer status information of a pre-selected list of frequently called telephone numbers from central server 204 of the central service to the party of monitoring client telephone 206. In this embodiment, central server 204 receives status information as described above, but instead of sending the information to monitoring client telephone 206, central server 204 posts the status information to, e.g., the monitoring party's web page account.

One of ordinary skill in the art will recognize that central server 204 may comprise a plurality of devices that are located in numerous geographical regions. Such devices would communicate with each other for the purpose of transmitting status update packets between different geographic regions. Accordingly, each device includes in its client database, records of all monitored and monitoring clients from all regions. When a device is notified of a status change of a monitored party, it transmits the status update packet to the device servicing the region where the monitoring party is located. In one embodiment for the present invention, each local region may include one device.

It will be appreciated that unique separate servers may support each region by communicating with each other. It will be further appreciated that a single server may support multiple regions or may be distributed across multiple regions.

A variety of different statuses, and uses of statuses, are consistent with the present disclosure. For example, a status may indicate who the monitored party is communicating with. In one embodiment, the central server could readily determine who the monitored party was communicating with, and make that information available to authorized monitoring parties.

A status may indicate who the monitored party is located near. As described herein, the location or approximate location of a phone may be determined. Accordingly, it may be determined which phones are located near the monitored phone. Such a status would be advantageous to, for example, a parent monitoring a child.

A status may indicate the state of the battery of a battery-powered phone. Such a status would be advantageous in allowing a monitoring party to determine whether a call to the monitored party would unduly deplete the battery of the monitored party.

A status may indicate the local time of the monitored party. For example, a monitored party may have traveled to a different time zone, and monitoring party can be informed of the local time of the monitored party. Such information would allow a monitoring party to exercise judgment as to whether it would be an appropriate time to call the monitored party. Such a status may also be used by the monitored party to block certain calls, for example, all calls after 11:00 PM of the local time of the monitored party.

A status may indicate whether the monitored party is using a text messaging or similar feature of a phone, such as a wireless phone with text messaging or email capability. Such a status may indicate, e.g., whether a monitored party is (i) available for text messaging, (ii) currently entering text, (iii) currently reading text, (iv) scrolling, and/or (v) playing online games or engaging in other online activity.

A status may indicate whether the monitored party wants top receive calls, or when the monitored party would like to receive calls. Such a capability may be extended only to certain kinds of calls. For example, the monitored party may desire to receive a call from customer service, or a call indicating a desired weather report or news report.

In one embodiment, the status information may trigger a message sent to the monitoring party. Such a message may be via email, instant messaging, audio or other means.

Status information need not be displayed, or might be displayed in conjunction with other types of output of status information. For example, status information could be output through the speaker on the phone, another speaker or other audio device. Thus, status may be output as messages such as "Bill is working right now", "Bill's is in New York and the local time is midnight", or "Bill's battery is low. Please use your judgment whether you should call him now."

Status information may also be indicated by a busy signal, or a different kind of busy signal than is normally output. Different busy signals may be used for different statuses. The selection of busy signals used for different statuses may be selected by the monitoring party and/or the monitored party.

A status may indicate whether the monitored party is moving, the speed and/or the direction of movement. For example, the location of a car phone or cellular phone may be periodically determined, and thus a changing location can indicate that the monitored party is moving. Additionally, the speed and direction of movement can likewise be easily determined. It may be desirable to "block" calls when in moving. It may also be desirable to prevent outgoing calls while in motion. Similarly, it may be advantageous to require an override code to be entered into a phone while in motion in order to permit an outgoing call. For example, a state law may prohibit talking on a phone while driving a car.

The particular patterns of status changes may be learned. For example, if a certain location is established as having a status during certain times, or a certain status is periodically established during certain times of the day, these patterns may be learned by appropriate machine learning techniques, as is well understood by those skilled in the art. Thus, the party may be able to avoid manually entering status information and other information if the requisite pattern has been learned. Similarly, once the pattern has been learned, the future status at certain times may be predicted. Messages and other information may be adapted to this prediction. For example, if it is learned that a status of unavailable occurs every work day between 2:00 PM and 3:00 PM then a calling party calling at 2:30 PM may be informed that the called party will become available at 3:00 PM.

An additional status may be that the phone has detected a noise, or a noise exceeding a certain decibel level, at any time or while its status was a predetermined status, such as "nobody home". Such an embodiment would be advantageous for monitoring a home while it is vacant. Detecting a noise could trigger, e.g., a call to a predetermined number (such as a work number) and could also play back during that call the previous thirty seconds of sound recorded prior to the detected noise.

Another type of remote monitoring would be to permit information from the phone to be transmitted to another location. For example, a log of calls made to the phone in the last four hours may be transmitted (e.g., via fax, email, over the phone) when a code is received (e.g., via a work phone, via email). Additionally, after receiving such a log, a party could indicate which calls he wanted to return (e.g., upon arriving back home). In one embodiment such calls may be returned without dialing; the order of returned calls could be established when indicating which calls to return, and the calls made by merely picking up the phone

We claim:

1. A method for monitoring one of a plurality of statuses of a first telephony device over a network by a second telephony device, the method comprising:

sending a request for a permission for said status of the first telephony device to be monitored by the second telephony device to a server;

receiving an authorizing signal indicating a permission from the first telephony device for said status of the first telephony device to be monitored by the second telephony device from the server;

receiving a message including said status of the first telephony device from the server, the message being encrypted using a public key of the second telephony device and accompanied by a digital signature of the server and said status being provided to the server from the first telephony device, and wherein when the first telephony device initiates a communication with a monitored third telephony device, the first telephony device provides said status of the first telephony device and a status of the monitored third telephony device to the server, said status of the first telephony device and the status of the monitored third telephony device indicating that the first telephony device and the monitored third telephony device are connected; and monitoring said status of the first telephony device by (i) verifying an identity of the server by validating the digital signature, and (ii) decrypting the message using a private key of the second telephony device.

2. The method of claim 1, further comprising:
sending a permission for the first telephony device to also monitor a status of the second telephony device to the server.

3. The method of claim 1, wherein receiving the authorizing signal includes receiving the authorizing signal in response to the server determining that a customer account of the second telephony device is in good standing.

4. The method of claim 1, further comprising:
sending a request to register the second telephony device with the server to the server, wherein the request includes a digital signature and an identifier that identifies the second telephony device.

5. The method of claim 4, wherein sending the request to register the second telephony device further comprises:
sending a request for a second network address and a security clearance.

6. The method of claim 4, further comprising:
receiving an indication of a successful registration of the second telephony device with the server from the server in response to the request to register.

7. The method of claim 1, further comprising:
encrypting the request with a public key of the server into an encrypted request for a permission for said status of the first telephony device to be monitored by the second telephony device; and
wherein sending the request comprises sending the encrypted request to the server.

8. The method of claim 1, further comprising:
receiving a first identifier identifying the first telephony device for storage and display from the server.

9. The method of claim 1, wherein sending the request comprises sending a request to be notified when a status change of a predetermined condition of the first telephony device occurs.

10. The method of claim 1, wherein said status indicates whether a user of the first telephony device has entered at least one predetermined DTMF code into the first telephony device.

11. The method of claim 1 further comprising:
sending an acknowledgment of a successful transmission of said status to the server in response to receiving said status.

12. A non-transitory computer-readable storage medium encoded with executable computer program code for monitoring one of a plurality of statuses of a first telephony device over a network by a second telephony device, the computer program code comprising program code for:

sending a request for a permission for said status of the first telephony device to be monitored by the second telephony device to a server;

receiving an authorizing signal indicating a permission from the first telephony device for said status of the first telephony device to be monitored by the second telephony device from the server;

receiving a message from the server, the message (i) including said status of the first telephony device, said status being provided in response to the server determining that said status of the first telephony device corresponds to status information that the second telephony device is configured to receive, and (ii) being encrypted using a public key of the second telephony device and accompanied by a digital signature of the server, wherein when the first telephony device initiates a communication with a monitored third telephony device, the first telephony device provides said status of the first telephony device and a status of the monitored third telephony device to the server, said status of the first telephony device and the status of the monitored third telephony device indicating that the first telephony device and the monitored third telephony device are connected; and monitoring said status of the first telephony device by (i) verifying an identity of the server by validating the digital signature, and (ii) decrypting the message using a private key of the second telephony device.

13. The non-transitory computer-readable storage medium of claim 12, wherein the computer program code further comprises program code for:
sending a permission to receive said status of the first telephony device to the server.

14. The non-transitory computer-readable storage medium of claim 12, wherein the computer program code further comprises program code receiving the authorizing signal in response to the server determining that a customer account of the second telephony device is in good standing.

15. The non-transitory computer-readable storage medium of claim 12, wherein the computer program code further comprises program code for:
sending a request to register the second telephony device with the server to the server, wherein the request includes a digital signature and an identifier that identifies the second telephony device.

16. The non-transitory computer-readable storage medium of claim 15, wherein the computer program code further comprises program code sending the request to register the second telephony device with the server by sending a request for a second network address and a security clearance.

17. The non-transitory computer-readable storage medium of claim 15, wherein the computer program code further comprises program code for:
receiving, an indication of a successful registration of the second telephony device with the server from the server in response to the request to register.

18. A system for monitoring one of a plurality of statuses of a first telephony device over a network by a second telephony device, comprising:
a non-transitory computer-readable storage medium encoded with executable computer program code for:
sending a request for a permission for said status of the first telephony device to be monitored by the second telephony device to a server;

receiving an authorizing signal indicating a permission from the first telephony device for said status of the first telephony device to be monitored by the second telephony device from the server;

receiving a message including said status of the first telephony device from the server, the message being encrypted using a public key of the second telephony device and accompanied by a digital signature of the server and said status being provided to the server from the first telephony device, and wherein when the first telephony device initiates a communication with a monitored third telephony device, the first telephony device provides said status of the first telephony device and a status of the monitored third telephony device to the server, said status of the first telephony device and the status of the monitored third telephony device indicating that the first telephony device and the monitored third telephony device are connected; and monitoring said status of the first telephony device by (i) verifying an identity of the server by validating the digital signature, and (ii) decrypting the message using a private key of the second telephony device.

* * * * *